(12) United States Patent
Rynderman et al.

(10) Patent No.: US 8,023,568 B2
(45) Date of Patent: Sep. 20, 2011

(54) CAPTURE, EDITING AND ENCODING OF MOTION PICTURES ENCODED WITH REPEATING FIELDS OR FRAMES

(75) Inventors: Michel Rynderman, Brighton, MA (US); Michael E. Phillips, Melrose, MA (US)

(73) Assignee: Avid Technology, Inc., Burlington, MA (US)

( * ) Notice: Subject to any disclaimer, the term of this patent is extended or adjusted under 35 U.S.C. 154(b) by 1606 days.

(21) Appl. No.: 11/363,718

(22) Filed: Feb. 28, 2006

(65) Prior Publication Data

US 2006/0233248 A1   Oct. 19, 2006

Related U.S. Application Data

(60) Provisional application No. 60/671,629, filed on Apr. 15, 2005.

(51) Int. Cl.
*H04N 7/12* (2006.01)
*H04N 11/02* (2006.01)
(52) U.S. Cl. .......... 375/240.26; 375/240.01; 375/240.12
(58) Field of Classification Search ............. 375/240.26, 375/240.12, 240.01
See application file for complete search history.

(56) References Cited

U.S. PATENT DOCUMENTS

| | | | |
|---|---|---|---|
| 6,324,216 B1 * | 11/2001 | Igarashi et al. | 375/240.14 |
| 6,469,744 B1 * | 10/2002 | Pearlstein | 348/554 |
| 6,510,177 B1 * | 1/2003 | De Bonet et al. | 375/240.16 |
| 2004/0230426 A1 * | 11/2004 | Endo | 704/224 |
| 2005/0204258 A1 * | 9/2005 | Hansen et al. | 714/755 |
| 2006/0140271 A1 * | 6/2006 | Wedi et al. | 375/240.12 |

* cited by examiner

*Primary Examiner* — David C. Payne
*Assistant Examiner* — Brian J Stevens
(74) *Attorney, Agent, or Firm* — Oliver Strimpel

(57) ABSTRACT

An image sequence captured at a first image rate is encoded as an encoded image sequence at a second image rate with information in the encoded image sequence indicative of images that are repeated when decoded. To assist in editing a video program using the encoded image sequence, the information in the encoded image sequence indicative of images that are repeated when decoded may be cleared. Further, image index information for the encoded image sequence may be generated. This image index information is used to map a temporal position of an image in a decoded image sequence to a position of corresponding data in the encoded image sequence. Temporal positions used with the image index information correspond to the first image rate.

49 Claims, 3 Drawing Sheets

CAPTURE, EDITING AND ENCODING OF MOTION PICTURES ENCODED WITH REPEATING FIELDS OR FRAMES

CROSS REFERENCE TO RELATED APPLICATION

This application claims right of priority to and the benefit, under 35 USC § of prior filed provisional application Ser. No. 60/671,629, filed Apr. 15, 2005, which is incorporated herein by reference.

BACKGROUND

There are several formats currently available for encoding motion pictures, i.e., a temporal sequence of images. Some of these formats are standards and include, but are not limited to, the standards commonly known as MPEG-2 (formally known as ISO/IEC 13818-2 or ITU-T Rec. H.262) and H.264 (formally known as ISO/IEC 14496-10 or ITU-T Rec. H.264). Other formats may borrow concepts from or use parts of these standards. For example, a format known as HDV encodes a progressively scanned high-definition image sequence captured at a rate of 23.976 frames per second using MPEG-2 encoding. The captured image sequence is encoded as an image sequence at a second image rate, e.g., 29.97 frames per second or 59.94 fields per second, with information in the encoded image sequence indicative of fields or frames that are repeated when decoded. In MPEG-2, this information includes a value known as a "repeat first field flag." In H.264 this information is provided by a variable called "pic_struct."

It can be difficult to edit a video program using an image sequence that has been encoded using repeated fields or frames. In particular, it is difficult to maintain accurate timing relationships between sources of image sequences and the edited video program. Such timing requires a proper understanding and use of the information that indicates whether a field or frame is repeated in a wide variety of possible editing operations.

SUMMARY

An image sequence captured at a first image rate is encoded as an encoded image sequence at a second image rate with information in the encoded image sequence indicative of images that are repeated when decoded. To assist in editing a video program using the encoded image sequence, the information in the encoded image sequence indicative of images that are repeated when decoded may be cleared. Further, image index information for the encoded image sequence may be generated. This image index information is used to map a temporal position of an image in a decoded image sequence to a position of corresponding data in the encoded image sequence. Temporal positions used with the image index information correspond to the first image rate.

Editing a video program involves defining a sequence of clips that reference source encoded image sequences using edit points. Each clip has a start and stop point (which may be inferred from a duration) in its corresponding source and a position for the clip in the edited video program. The temporal resolution of these edit points corresponds to the first image rate. The information in the encoded image sequence indicative of images that are repeated when decoded may be ignored or may have already been cleared. During editing, the edited video program may be played back at the first image rate. To playback the edited video program at another image rate, such as the second image rate, images may be repeated. Whether an image is repeated depends on a cadence that corresponds to a difference between the first image rate and the other image rate and is independent of any information in the source encoded image sequences that may indicative of images that are repeated when decoded.

An edited video program may be output as an encoded image sequence, using the source encoded image sequences referenced by the sequence of clips. The encoded image sequence is constructed according to the edited sequence of clips, using the source encoded image sequences. In particular, the encoder clears any information in the source encoded image sequences indicative of images that are repeated when decoded. In the output encoded image sequence, information indicative of images that are repeated when decoded is set according to a cadence associated with a difference between the first image rate and the second image rate.

DETAILED DESCRIPTION

Figure 1:
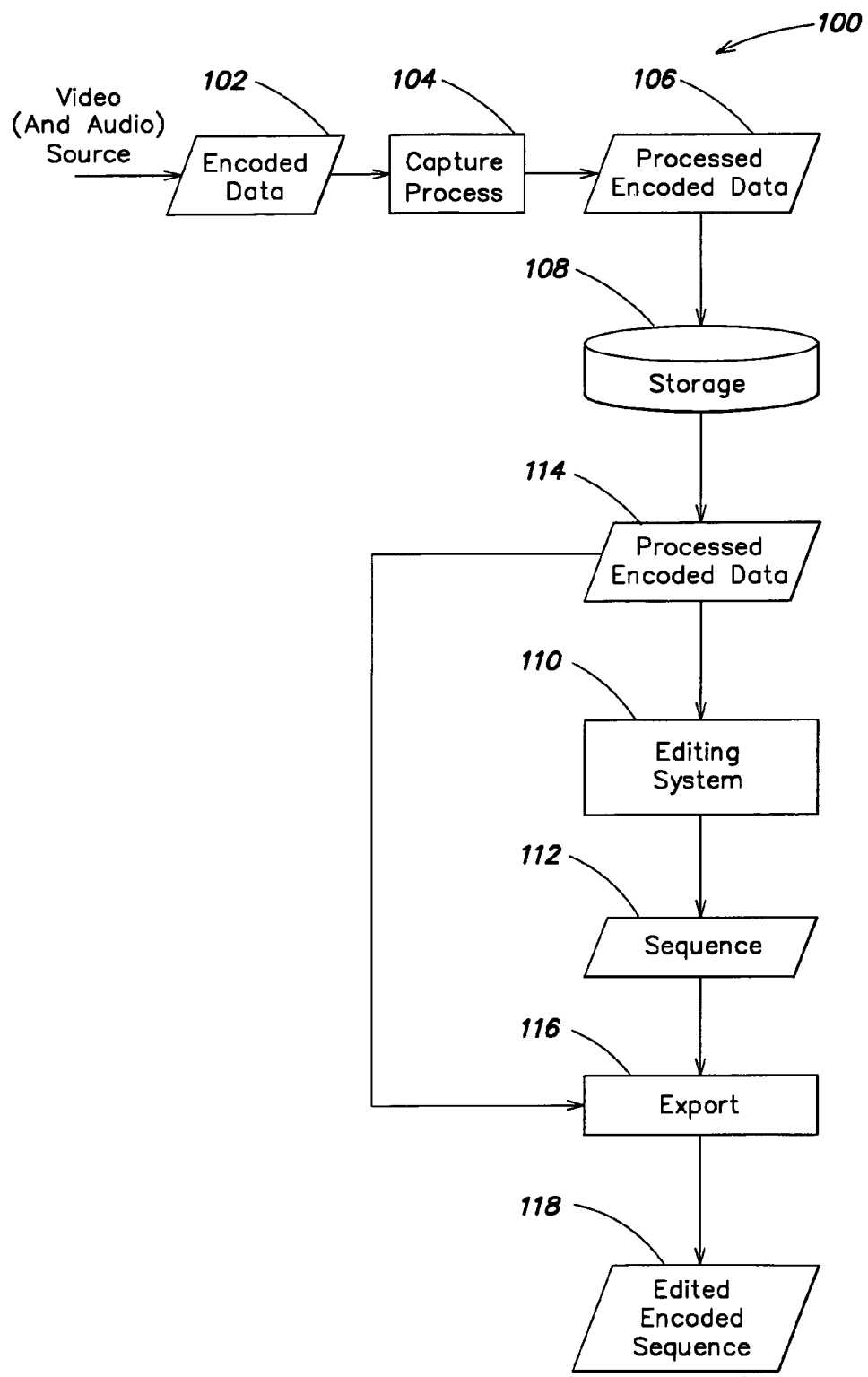
FIG. 1 is data flow diagram of an example system that captures, edits and encodes audio and video data.

Referring now to FIG. 1, an example system 100 for the capture, editing and encoding of motion pictures will now be described. In this example system, encoded data 102 from a source of audiovisual information (not shown), such as a camera, is received. The encoded data is encoded with repeating images, whether fields or frames. Thus the encoded data represents an image sequence that was captured at a first image rate (such as 24/23.976 frames per second or 48/47.952 fields per second) and is encoded for playback at a second image rate (such as 25, 29.97 or 30 frames per second or 50, 59.94 or 60 fields per second). A capture process 104, described in more detail below, processes the encoded data 102 to product processed encoded data 106 that is stored in storage 108. An editing system 110, described in more detail below, with access to storage 108 allows an operator to define a sequence 112 of clips of the processed encoded data 106. The edited sequence 112 is used by an export process 116, described in more detail below, along with the encoded image sequences 114 from storage 108 to produce an edited encoded sequence 118.

There are several formats currently available for encoding motion pictures, i.e., a temporal sequence of images, to produce the encoded data 102. Some formats use intraframe compression, while others use both interframe and intraframe compression. Some of these formats are standards and include, but are not limited to, the standards commonly known as MPEG-2 and H.264. Other formats may borrow concepts from or use parts of these standards. For example, a format known as HDV encodes progressively scanned high-definition image sequences captured at a rate of 23.976 frames per second using MPEG-2 encoding. The captured image sequences is encoded as an image sequence at a second image rate, e.g., 29.97 frames per second or 59.94 fields per second, with information in the encoded image sequence indicative of images that are repeated when decoded. Such information may include any metadata that indicates repetition of image information at the granularity of a field or frame.

In MPEG-2, this information is known as a "repeat first field flag," defined in ISO/IEC 13818-2, Subpart D.7.4.1-6.3.10 (Picture coding extension). In particular, each picture in an encoded image sequence has a "repeat first field flag." How the repeat first field flag is interpreted when decoded depends on two other values in the encoded image sequence. First, a "progressive_frame" value for each picture indicates whether two fields of a frame are interlaced (i.e., were sampled at different points in time), by being set to zero, or progressive (i.e., were sampled at the same point in time or are temporally coherent), by being set to one. Second, each encoded sequence also has a flag (called "progressive_sequence") indicating whether the sequence is progressive (set to one) or not (set to zero). The repeat first field flag cannot be set if the progressive sequence and progressive frame values are both zero.

When the progressive sequence value is zero and the progressive frame value is one, if the repeat first field flag is set for a picture in an encoded image sequence, then the repeat first field flag causes a decoder to repeat a field. The first field is repeated, which may be either the top or bottom field depending on another flag that indicates whether the top or bottom field is first.

When the progressive sequence value is one, and if the repeat first field flag is set for a picture in an encoded image sequence, then the repeat first field flag causes a decoder to generate two or three frames depending on the value of the top field first flag.

For, example, if a sequence of images originally captured at 24/23.976 frames per second were encoded using MPEG-2 as a 59.94 or 60 field per second sequence, or as a 29.97 or 30 frame per second sequence, then the "repeat first field" flag would be set for at least some of the pictures in the encoded image sequence.

In H.264 several pieces of information indicate whether a field is to be repeated, as defined in ISO/IEC 14496-10, Subpart D.2.2 (in particular, a "pic_struct"). In particular, H.264 permits several pic_struct values which indicate that a field or frame is to be repeated. A value of "5" indicates that a picture should be displayed as a top field first, then a bottom field, then a top field repeated. A value of "6" indicates that a picture should be displayed as a bottom field first, then a top field, then a bottom field repeated. A value of "7" indicates frame doubling, or that a picture should be displayed as a frame two times consecutively. A value of "8" indicates frame tripling, or that a picture should be displayed as a frame that is displayed three times consecutively.

For example, if a sequence of images originally captured at 24/23.976 frames per second were encoded using H.264 as a 59.94 or 60 field per second sequence, or as a 29.97 or 30 frame per second sequence, then the "pic_struct" values of 5, 6, 7 or 8 would be found in the encoded image sequence.

The encoded data 102 also may include audio data associated with the video data. In some formats, such as MPEG-2, the audio data may be multiplexed with the video data within the encoded data 102. The audio data may be compressed or uncompressed.

To assist in editing a video program using the encoded image sequence, the encoded image sequence is subjected to a capture process 104. In particular, the information in the encoded image sequence indicative of images that are repeated when decoded may be cleared. For example, using MPEG-2, the repeat first field flags would be cleared i.e., reset to zero. Using H.264, "pic_struct" values of 5, 6, 7 or 8 would be cleared to either 0 (such as for 24/23.976 frame per second material) or 1 or 2 (such as for 48/47.952 field per second material).

Further, image index information for the encoded image sequence may be generated. This image index information is used to map a temporal position of an image in a decoded image sequence to a position of corresponding data in the encoded image sequence. Temporal positions used with the image index information correspond to the first image rate. The image index information may include a known amount of data for each image if the encoding process produces the same amount of encoded data for each encoded image. If the encoding process produces a different amount of data for each encoded image, then an image index is created and used.

In some formats of encoded video data, such as MPEG-2, the temporal order of the encoded images is different from the order in which the encoded data appears in the encoded bitstream. Thus the image index maps the temporal order of images to the bitstream order of encoded data for the images and to the position of the encoded data in the encoded bitstream. Such an image index is described in U.S. Pat. Nos. 6,337,880, 6,584,152 and 6,792,433.

The encoded image sequence may already have an original image index that maps a temporal position of an image in a decoded image sequence to a position of corresponding data in the encoded image sequence, wherein the temporal positions used in the image index correspond to the second image rate. In this case, the image index takes into account the repeated images. If the information indicative of the repeated images is cleared from the encoded image sequence, a new image index is created. The new image index may be created by processing the encoded image sequence. Alternatively the new image index may be created by converting the original image index into an image index which maps a temporal position of an image in a decoded image sequence to a position of corresponding data in the encoded image sequence, wherein the temporal positions used in the image index correspond to the first image rate.

The encoded image sequence with cleared information about repeated images and its image index information may be stored in a separate data file, such as a data file in the material exchange format (MXF), which is the subject of the standardization process of the Society of Motion Picture and Television Engineers (SMPTE), and is defined in documents including SMPTE S377M through 394M, with SMPTE Engineering Guidelines EG41 and 42. In addition, any audio data (if present) may be separated from the video data and stored in a separate file.

Thus, the processed encoded data 106 includes separate video and (optional) audio files. The processed encoded data is stored in storage 108. Storage 108 may have a number of different forms. It may be storage in a personal computer, storage within a camera, or shared storage accessed by multiple computers over a network. The storage may be fixed within a device or may be removable from a device to which it is attached. In general the storage should be random-access storage, and may be rewriteable.

The capture process 104 may be part of live recording or may be part of processing of prerecorded information. For example, if the capture process 104 and storage 108 are implemented by either software or circuitry in the housing of a video camera, the processed encoded data 106 may be generated at the time of live recording of the encoded data 102. In such an implementation, the encoded data 102 may be a standard recording format for a camera and the processed encoded data 108 provides a format that is more suitable for editing. As another example, the capture process 104 may be implemented by either software or circuitry associated with an editing system to generate the processed encoded data 106 as part of an import or preparation step prior to editing.

Figure 2:
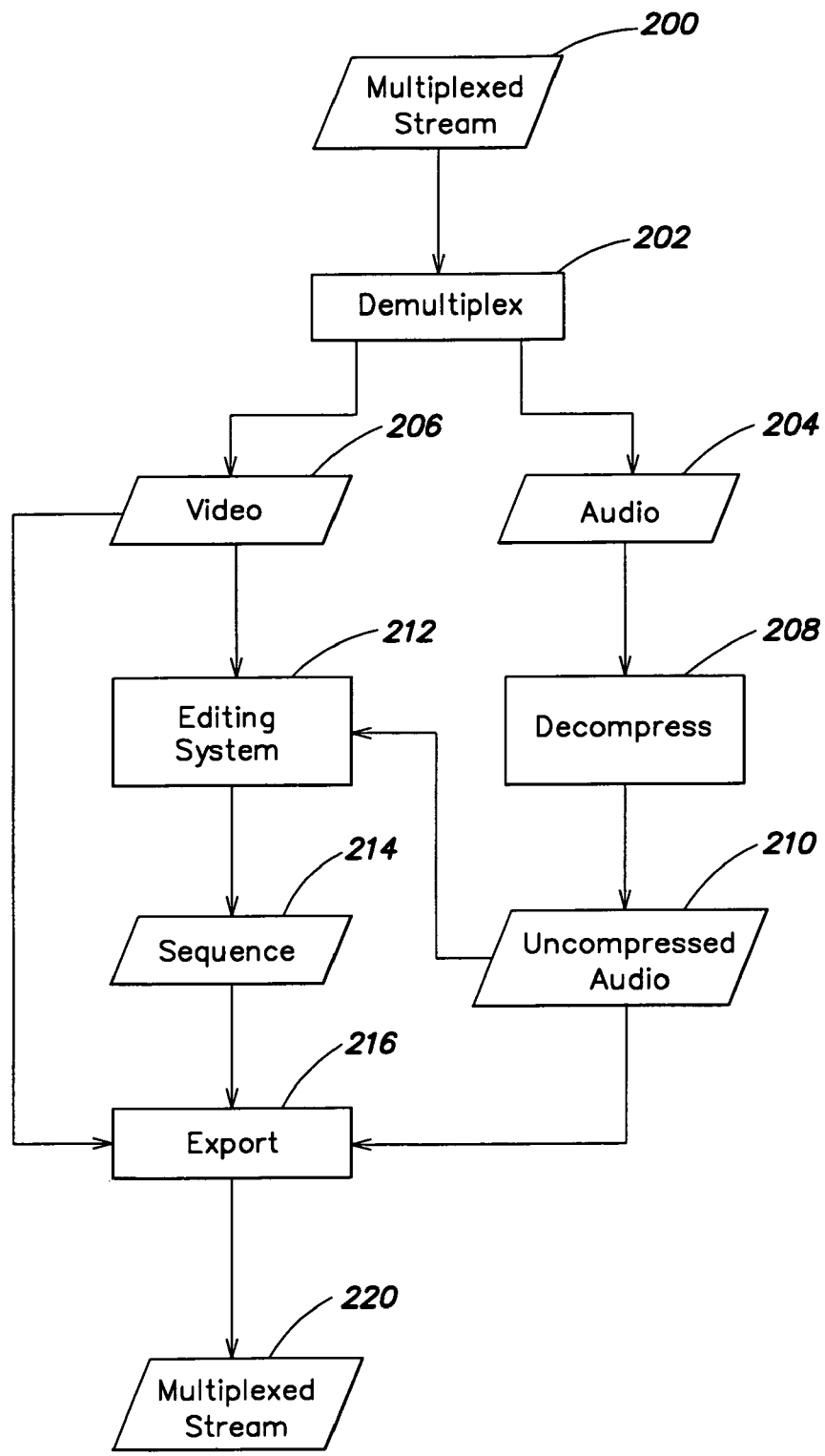
FIG. 2 is data flow diagram illustrating processing of multiplexed, encoded audio and video data.

Turning now to FIG. 2, the additional processing of any audio data associated with the video data will now be described. In general, as noted above, any audio data (if present) may be separated from the video data and stored in a separate file. If this audio data is multiplexed with the video data within the received encoded data 200, the encoded data is demultiplexed 202 to separate the audio data 204 and the video data 206. If this audio data is compressed, it may be decompressed 208. The uncompressed audio data 210 then may be stored in a separate file. The editing system 212 then accesses the separate video data 206 and uncompressed audio data 210. The export process 216 applied to any edited sequence 214 uses the separate video data 206 and uncompressed audio data 210. The audio data may be compressed and multiplexed with the encoded video data to produce a multiplexed output stream 220.

Turning again to FIG. 1, the editing of the processed encoded data 106 will now be described in more detail. Editing a video program using such audio and video data involves defining a sequence 112 of clips that reference source encoded image sequences using edit points. Each clip has a start and stop point (which may be inferred from a duration) in its corresponding source and a position for the clip in the edited video program. The temporal resolution of these edit points corresponds to the first image rate. Generally, the editing system 110 permits an editor to specify these edit points at any frame boundary at the resolution of the first image rate. The information in any source encoded image sequence indicative of images that are repeated when decoded may be ignored by the editor or may have already been cleared by the capture process.

Playback of an edited sequence involves random access into the encoded image sequence. The image index information, as described above, provides this capability. In particular, the image index information is used to map a temporal position of an image in a decoded image sequence to a position of corresponding data in the encoded image sequence. Temporal positions used in an image index correspond to the first image rate. The edited video program may be played back at the first image rate. To playback the edited video program at another image rate, such as the second image rate, images may be repeated. Whether an image is repeated depends on a cadence that corresponds to a difference between the first image rate and the other image rate, but is independent of any information in the source encoded image sequences that may indicative of images that are repeated when decoded.

An edited video program is output as an encoded image sequence, using source encoded image sequences referenced by the sequence of clips. The encoded image sequence is constructed according to the edited sequence of clips, using the source encoded image sequences. In particular, any information in the source encoded image sequences, used in the sequence of clips, indicative of images that are repeated when decoded is cleared. In the output encoded image sequence, information indicative of images that are repeated when decoded is set according to a cadence associated with a difference between the first image rate and the second image rate. In some cases, the result of editing involves applying an effect to a source encoded image sequence. In such a case, the encoded image sequence needs to be decoded, modified according to the effect, and re-encoded.

Figure 3:
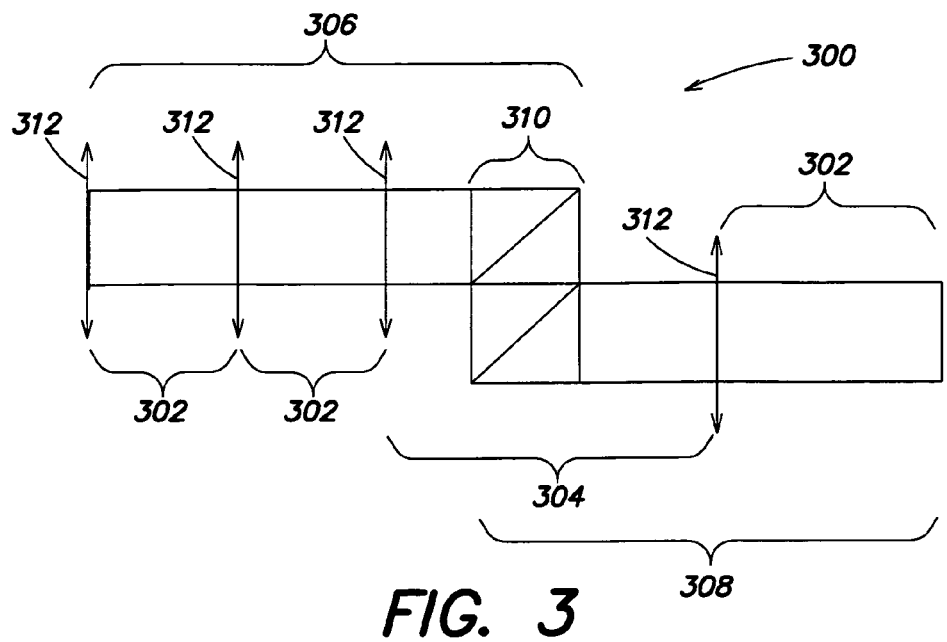
FIG. 3 is an illustration of an effect applied to encoded data.
Figure 4:
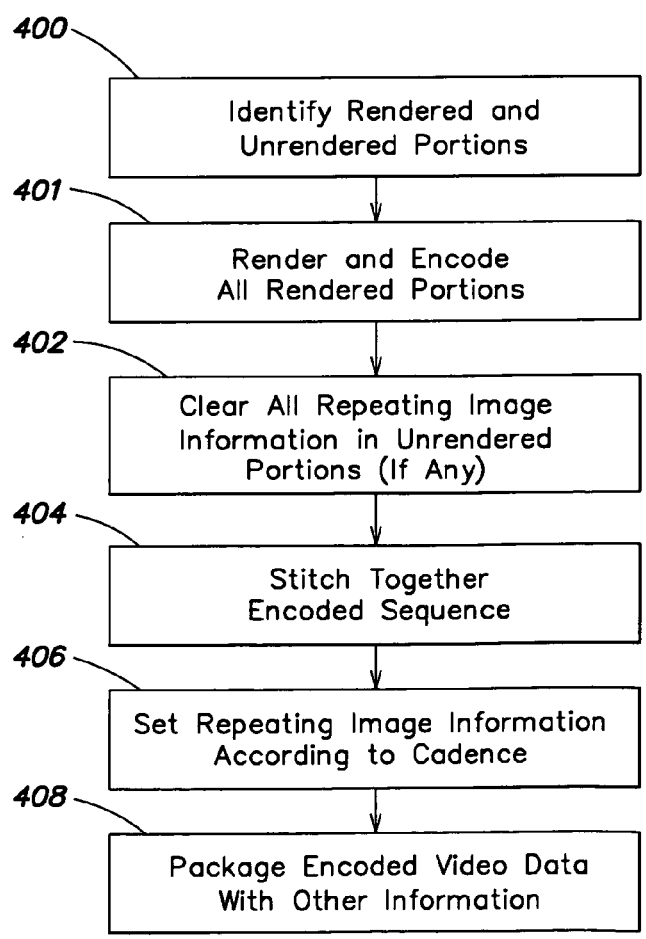
FIG. 4 is a flowchart describing how to encode an edited sequence.

Referring now to FIGS. 3 and 4, the encoding process will now be described in more detail. FIG. 3 illustrates a portion of an edited sequence 300. This portion of an editing sequence includes a first clip 306 and a second clip 308, and a transition 310 from the first clip to the second clip. The source encoded image sequences in each clip also will include one or more I-frames 312. Any portion of the edited sequence between two I-frames of its source material that is complete and that does not require any rendering (for example, due to an effect) can be used in the output encoded data directly in its already encoded form. These portions are called unrendered portions 302. Any portion of the edited sequence between two I-frames that requires rendering (for example to render a transition) is decoded, rendered and then re-encoded. These portions are called rendered portions 304. Thus, the edited sequence can be considered to include unrendered portions 302 and rendered portions 304.

Referring now to FIG. 4, the encoding process begins by identifying (400) all unrendered portions and rendered portions. The rendered portions are rendered and encoded (401). For unrendered portions, the encoder clears (402) any information in the source encoded image sequences indicative of images that are repeated when decoded, if that information was not previously cleared. The encoded rendered portions and the source encoded image sequences for the unrendered portions are then stitched (404) together into an encoded sequence. When stitching these encoded portions together, the state information in the headers that is used for decoding is made internally consistent. Next, information indicative of images that are repeated when decoded is then set (406) in the encoded sequence according to a cadence. The cadence corresponds to the difference between the first image rate (at which the source image sequence was originally captured) and the desired playback rate to be used when decoding the encoded edited sequence. The encoded video data then may be packaged (408) with other information. For example, the video data may be multiplexed with audio data and stored in a file.

The various components of the system described herein may be implemented as a computer program using a general-purpose computer system. The capture process and related storage also may be found in a camera or in a field capture device connected to a camera to permit the capture process to be performed during live recording. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIG. 1 may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A computer-implemented method for processing data, the method comprising:
   receiving an image sequence captured at a first image rate by an image capture device and encoded by a media encoder as an encoded image sequence having a second image rate with information in the encoded image sequence indicative of images that are repeated when decoded; and
   creating image index information of the encoded image sequence, wherein the image index information includes at least one of a known amount of data for one or more images in the encoded image sequence and offset information, wherein the image index information is used to map a temporal position of an image in a decoded image sequence to a position of corresponding data in the encoded image sequence, wherein the temporal positions used with the image index information correspond to the first image rate.

2. The computer-implemented method of claim 1, wherein the first image rate is 23.976 images per second and the second image rate is 29.97 images per second.

3. The computer-implemented method of claim 1, wherein the first image rate is 24 images per second and the second image rate is 30 images per second.

4. The computer-implemented method of claim 1, wherein the first image rate is 24 images per second and the second image rate is 60 images per second.

5. The computer-implemented method of claim 1, wherein the first image rate is 23.976 images per second and the second image rate is 59.94 images per second.

6. The computer-implemented method of claim 1, wherein the image sequence is encoded using intraframe compression.

7. The computer-implemented method of claim 1, wherein the image sequence is encoded using both interframe and intraframe compression.

8. The computer-implemented method of claim 7, wherein the temporal positions of images in the image sequence are in a different order than the positions of corresponding data in the encoded image sequence.

9. The computer-implemented method of claim 1, further comprising clearing all information in the encoded image sequence indicative of images that are repeated when decoded.

10. The computer-implemented method of claim 9, wherein the information in the encoded image sequence indicative of images that are repeated when decoded includes a repeat field flag associated with each image that is repeated when decoded.

11. The computer-implemented method of claim 10, wherein the encoded image sequence is encoded according to the MPEG-2 standard.

12. The computer-implemented method of claim 9, wherein the encoded image sequence is encoded according to the H.264 standard.

13. The computer-implemented method of claim 9, wherein the first image rate is 23.976 images per second and the second image rate is 29.97 images per second.

14. The computer-implemented method of claim 9, wherein the first image rate is 24 images per second and the second image rate is 29.97 images per second.

15. The computer-implemented method of claim 9, wherein the first image rate is 24 images per second and the second image rate is 59.94 images per second.

16. The computer-implemented method of claim 9, wherein the first image rate is 23.976 images per second and the second image rate is 59.94 images per second.

17. The computer-implemented method of claim 9, wherein the image sequence is encoded using intraframe compression.

18. The computer-implemented method of claim 9, wherein the image sequence is encoded using both interframe and intraframe compression.

19. The computer-implemented method of claim 9, wherein the temporal positions of images in the image sequence are in a different order than the positions of corresponding data in the encoded image sequence.

20. The computer-implemented method of claim 9, wherein creating the image index information comprises:
   receiving an original image index of the encoded image sequence that maps a temporal position of an image in a decoded image sequence to a position of corresponding data in the encoded image sequence, wherein the temporal positions used in the image index correspond to the second image rate; and
   converting the original image index into a new image index of the encoded image sequence, wherein the image index information includes at least one of a known amount of data for one or more images in the encoded image sequence and offset information, wherein the image index information maps a temporal position of an image in a decoded image sequence to a position of corresponding data in the encoded image sequence, wherein the temporal positions used in the new image index correspond to the first image rate.

21. The computer-implemented method of claim 9, wherein the data includes audio data associated with the encoded image sequence, the method further comprising:
   separating the encoded image sequence and the audio data from the data into separate data files.

22. The computer-implemented method of claim 21, wherein the audio data and the encoded image sequence are multiplexed together in the data and wherein the step of separating includes demultiplexing the audio data from the encoded image sequence.

23. The computer-implemented method of claim 9, wherein the encoded image sequence is received and the method is performed during live recording of the data.

24. The computer-implemented method of claim 9, wherein the method is performed by circuitry in the housing of a portable video camera.

25. The computer-implemented method of claim 9, wherein the encoded image sequence is recorded and the method is performed after recording of the data.

26. The computer-implemented method of claim 1, wherein creating the image index information comprises:
   receiving an original image index of the encoded image sequence that maps a temporal position of an image in a decoded image sequence to a position of corresponding data in the encoded image sequence, wherein the temporal positions used in the image index correspond to the second image rate; and
   converting the original image index into a new image index of the encoded image sequence that maps a temporal position of an image in a decoded image sequence to a position of corresponding data in the encoded image sequence, wherein the temporal positions used in the new image index correspond to the first image rate.

27. The computer-implemented method of claim 1, wherein the data includes audio data associated with the encoded image sequence, the method further comprising:
   separating the encoded image sequence and the audio data from the data into separate data files.

28. The computer-implemented method of claim 27, wherein the audio data and the encoded image sequence are multiplexed together in the data and wherein the step of separating includes demultiplexing the audio data from the encoded image sequence.

29. The computer-implemented method of claim 1, wherein the encoded image sequence is received and the method is performed during live recording of the data.

30. The computer-implemented method of claim 29, wherein the method is performed by circuitry in the housing of a portable video camera.

31. The computer-implemented method of claim 1, wherein the encoded image sequence is recorded and the method is performed after recording of the data.

32. The method of claim 1, further comprising:
   permitting an editor to create a sequence of segments of encoded image sequences at a temporal resolution corresponding to the first image rate; and
   during playback of the encoded image sequence, decoding the encoded image sequence, using the image index information, to produce a decoded image sequence at the first image rate by not repeating images.

33. The method of claim 32, wherein the temporal positions used with the image index information correspond to the first image rate.

34. The method of claim 33, further comprising, prior to decoding, clearing the information in the encoded image sequences indicative of images that are repeated when decoded.

35. The method of claim 34, further comprising creating the image index information.

36. The method of claim 32, wherein decoding includes ignoring the information in the encoded image sequences indicative of images that are repeated when decoded.

37. The method of claim 32, wherein the temporal positions used with the image index information correspond to the second image rate.

38. The method of claim 37, wherein decoding includes ignoring the information in the encoded image sequences indicative of images are repeated when decoded.

39. The method of claim 37, further comprising, prior to decoding, clearing the information in the encoded image sequences indicative of images that are repeated when decoded.

40. The method of claim 32, wherein the encoded data includes audio data associated with the encoded image sequence, the method further comprising:
   separating the encoded image sequence and the audio data from the encoded data into separate data files.

41. The method of claim 40, wherein the audio data and the encoded image sequences are multiplexed together in the encoded data and wherein separating includes demultiplexing the audio data from the encoded image sequence.

42. The method of claim 32, wherein the information in the encoded image sequences indicative of images that are repeated when decoded includes a repeat field flag associated with encoded data for each image that is to be repeated when decoded.

43. The method of claim 42, wherein the encoded image sequence is encoded according to the MPEG-2 standard.

44. The method of claim 32, wherein the encoded image sequence is encoded according to the H.264 standard.

45. The method of claim 1, further comprising:
   receiving the image index information for the encoded image sequence;
   permitting an editor to create a sequence of segments of encoded image sequences at a temporal resolution corresponding to the first image rate; and
   decoding the encoded image sequence, during playback of the encoded image sequence, using the image index information, to produce a decoded image sequence at the first image rate by not repeating images.

46. An apparatus for processing data, the apparatus comprising:
   an input for receiving an image sequence captured at a first image rate and encoded as an encoded image sequence having a second image rate with information in the encoded image sequence indicative of images that are repeated when decoded; and
   a processor programmed to create image index information for the encoded image sequence, wherein the image index information includes at least one of a known amount of data for one or more images in the encoded image sequence and offset information, wherein the image index information is used to map a temporal position of an image in a decoded image sequence to a position of corresponding data in the encoded image sequence, wherein the temporal positions used with the image index information correspond to the first image rate.

47. A computer program product, comprising:
   a computer readable medium; and
   computer program instructions stored on the computer readable medium that, when processed by a computer, instruct the computer to perform a method for processing data, the method comprising:

receiving an image sequence captured at a first image rate and encoded as an encoded image sequence having a second image rate with information in the encoded image sequence indicative of images that are repeated when decoded; and creating image index information for the encoded image sequence, wherein the image index information includes at least one of a known amount of data for one or more images in the encoded image sequence and offset information, wherein the image index information that is used to map a temporal position of an image in a decoded image sequence to a position of corresponding data in the encoded image sequence, wherein the temporal positions used with the image index information correspond to the first image rate.

48. A computer system for processing data, the computer system comprising:

an input for receiving an image sequence captured at a first image rate and encoded as an encoded image sequence having a second image rate with information in the encoded image sequence indicative of images that are repeated when decoded; and a processor programmed to create image index information for the encoded image sequence, wherein the image index information includes at least one of a known amount of data for one or more images in the encoded image sequence and offset information, wherein the image index information is used to map a temporal position of an image in a decoded image sequence to a position of corresponding data in the encoded image sequence, wherein the temporal positions used with the image index information correspond to the first image rate.

49. A computer-implemented method for processing data, the method comprising:

receiving an image sequence captured by an image capture device and encoded at a first image rate by a media encoder as an image sequence having a second image rate with information in the encoded image sequence indicative of images that are repeated when decoded;

clearing all information in the encoded image sequence indicative of images that are repeated when decoded;

receiving image index information for the encoded image sequence that is used to map a temporal position of an image in a decoded image sequence to a position of corresponding data in the encoded image sequence wherein the temporal positions used with the image index information correspond to the first image rate;

permitting an editor to create a sequence of segments of encoded image sequences at a temporal resolution corresponding to the first image rate; and decoding the encoded image sequence, during playback of the encoded image sequence, using the image index information, to produce a decoded image sequence at a second image rate different from the first image rate by repeating fields according to a cadence based on the difference between the first image rate and the second image rate.

* * * * *